(12) United States Patent
Son et al.

(10) Patent No.: US 12,347,888 B2
(45) Date of Patent: Jul. 1, 2025

(54) BATTERY MODULE ENSURING AIRTIGHTNESS FOR HV TERMINAL, AND BATTERY PACK COMPRISING SAME

(71) Applicant: LG ENERGY SOLUTION, LTD., Seoul (KR)

(72) Inventors: Chang Keun Son, Daejeon (KR); Sang Yoon Jeong, Daejeon (KR); Hyeon Ki Yun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 680 days.

(21) Appl. No.: 17/635,450

(22) PCT Filed: Dec. 15, 2020

(86) PCT No.: PCT/KR2020/018367
§ 371 (c)(1),
(2) Date: Feb. 15, 2022

(87) PCT Pub. No.: WO2021/145574
PCT Pub. Date: Jul. 22, 2021

(65) Prior Publication Data
US 2022/0294072 A1  Sep. 15, 2022

(30) Foreign Application Priority Data

Jan. 16, 2020 (KR) .................. 10-2020-0005730

(51) Int. Cl.
*H01M 50/296* (2021.01)
*H01M 50/24* (2021.01)
(Continued)

(52) U.S. Cl.
CPC ......... *H01M 50/296* (2021.01); *H01M 50/24* (2021.01); *H01M 50/249* (2021.01); *H01M 50/262* (2021.01); *H01M 50/507* (2021.01)

(58) Field of Classification Search
CPC .. H01M 50/296; H01M 50/249; H01M 50/24; H01M 50/262; H01M 50/507
See application file for complete search history.

(56) References Cited

U.S. PATENT DOCUMENTS

2009/0053588 A1   2/2009  Marukawa
2011/0300424 A1  12/2011  Kim et al.
(Continued)

FOREIGN PATENT DOCUMENTS

CN  2445439 Y    8/2001
CN  104868182 A  8/2015
(Continued)

OTHER PUBLICATIONS

Japanese Office Action for Japanese Application No. 2022-509697, dated Mar. 27, 2023, with English translation.
(Continued)

*Primary Examiner* — Olatunji A Godo
(74) *Attorney, Agent, or Firm* — Birch, Stewart, Kolasch & Birch, LLP

(57) ABSTRACT

The present invention relates to a battery module and a battery pack, and provides airtightness, particularly, a sealing property for a high voltage (HV) terminal, thereby preventing the penetration of moisture from the outside and increasing the durability of the battery pack.

12 Claims, 5 Drawing Sheets

(51) Int. Cl.
   *H01M 50/249* (2021.01)
   *H01M 50/262* (2021.01)
   *H01M 50/507* (2021.01)

(56) References Cited

U.S. PATENT DOCUMENTS

| | | |
|---|---|---|
| 2012/0276442 A1 | 11/2012 | Kim et al. |
| 2014/0079959 A1 | 3/2014 | Nicoson |
| 2015/0243946 A1 | 8/2015 | Ahn |
| 2018/0076438 A1 | 3/2018 | DeKeuster et al. |
| 2018/0190965 A1 | 7/2018 | Lee et al. |
| 2021/0288376 A1* | 9/2021 | Jeon .................. H01M 50/207 |

FOREIGN PATENT DOCUMENTS

| | | |
|---|---|---|
| CN | 107425332 A | 12/2017 |
| CN | 206866628 U | 1/2018 |
| CN | 207097939 U | 3/2018 |
| CN | 109478615 A | 3/2019 |
| CN | 109690817 A | 4/2019 |
| EP | 2 355 209 A1 | 8/2011 |
| JP | 2009-54351 A | 3/2009 |
| JP | 2011-154881 A | 8/2011 |
| JP | 2012-109152 A | 6/2012 |
| JP | 2012-238473 A | 12/2012 |
| JP | 2013-120675 A | 6/2013 |
| JP | 2016-62695 A | 4/2016 |
| JP | 2016-81725 A | 5/2016 |
| JP | 2018-37221 A | 3/2018 |
| JP | 2018-114429 A | 7/2019 |
| KR | 10-1029119 B1 | 4/2011 |
| KR | 10-2011-0133256 A | 12/2011 |
| KR | 10-1222264 B1 | 1/2013 |
| KR | 10-2014-0029671 A | 3/2014 |
| KR | 10-2015-0098831 A | 8/2015 |
| KR | 10-2017-0071795 A | 6/2017 |
| KR | 10-2017-0073468 A | 6/2017 |
| KR | 10-1799096 B1 | 11/2017 |
| KR | 10-2018-0058552 A | 6/2018 |

OTHER PUBLICATIONS

International Search Report (PCT/ISA/210) issued in PCT/KR2020/018367 mailed on Apr. 9, 2021.

Extended European Search Report for European Application No. 20913150.7 dated Oct. 7, 2022.

Chinese Notice of Allowance and Search Report for Chinese Application No. 202080059033.7, dated Dec. 23, 2024, with English translation.

* cited by examiner

[FIG. 1]
CONVENTIONAL ART
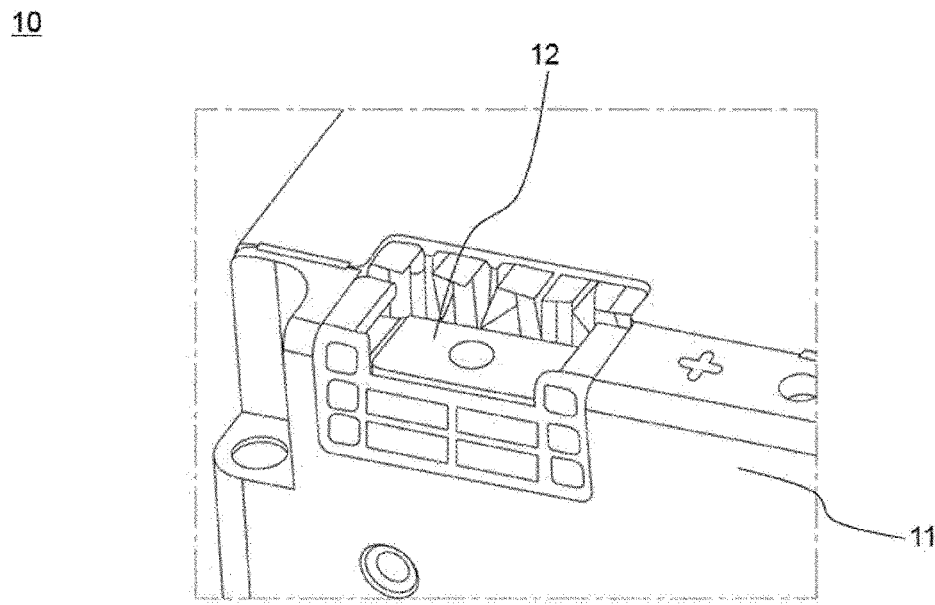

[FIG. 2]
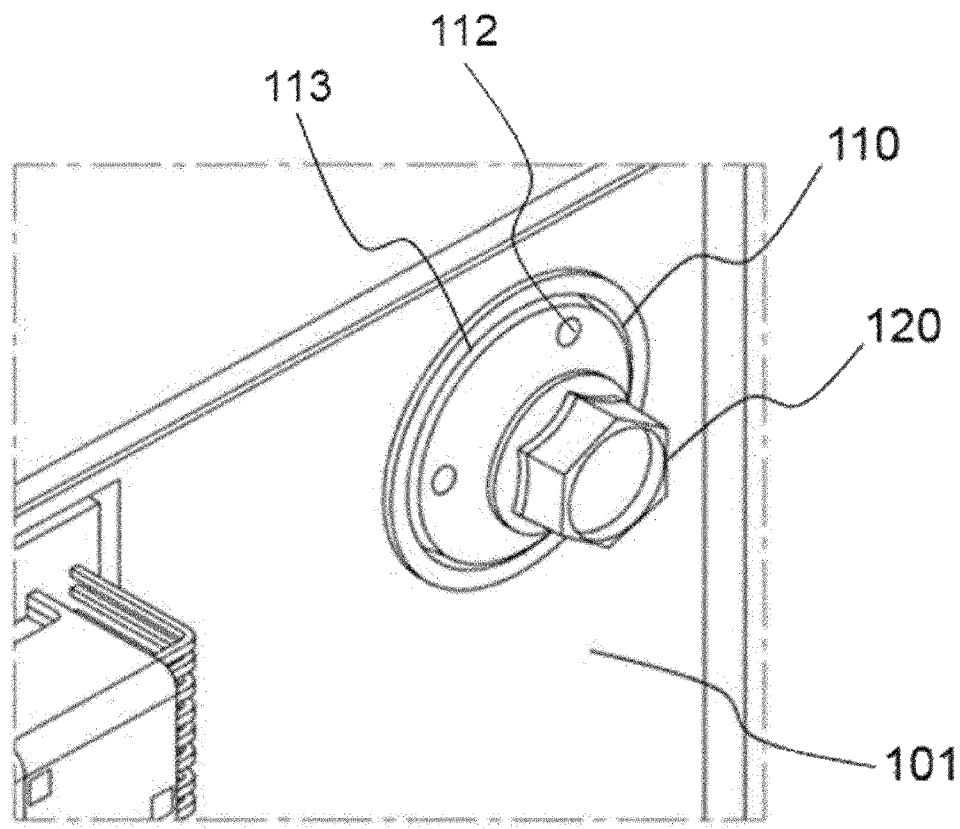

[FIG. 3]
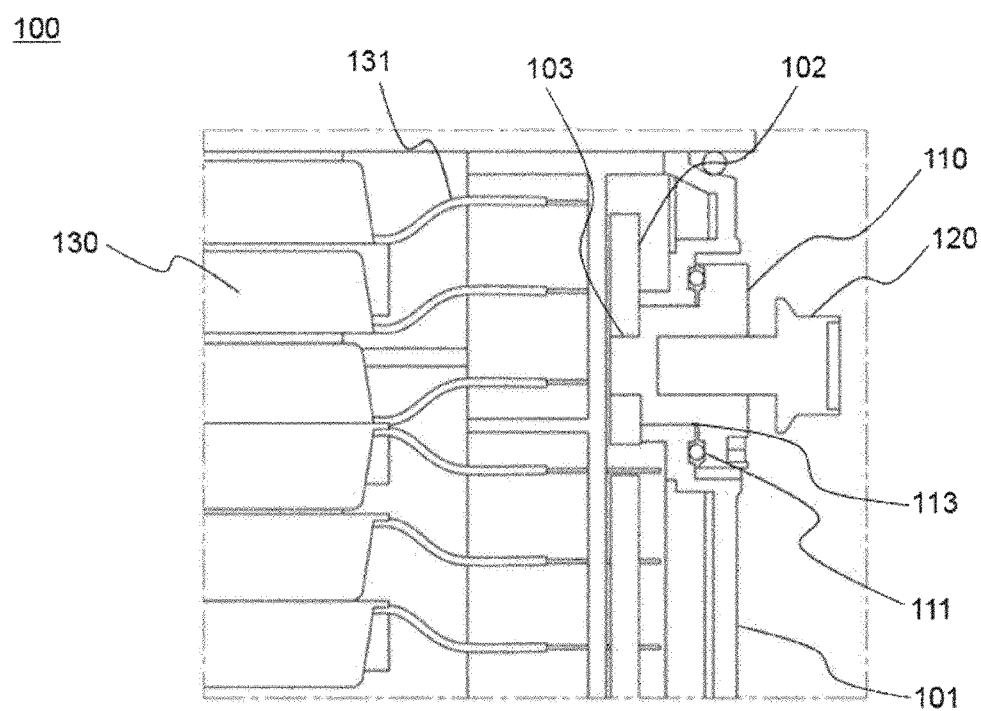

[FIG. 4]
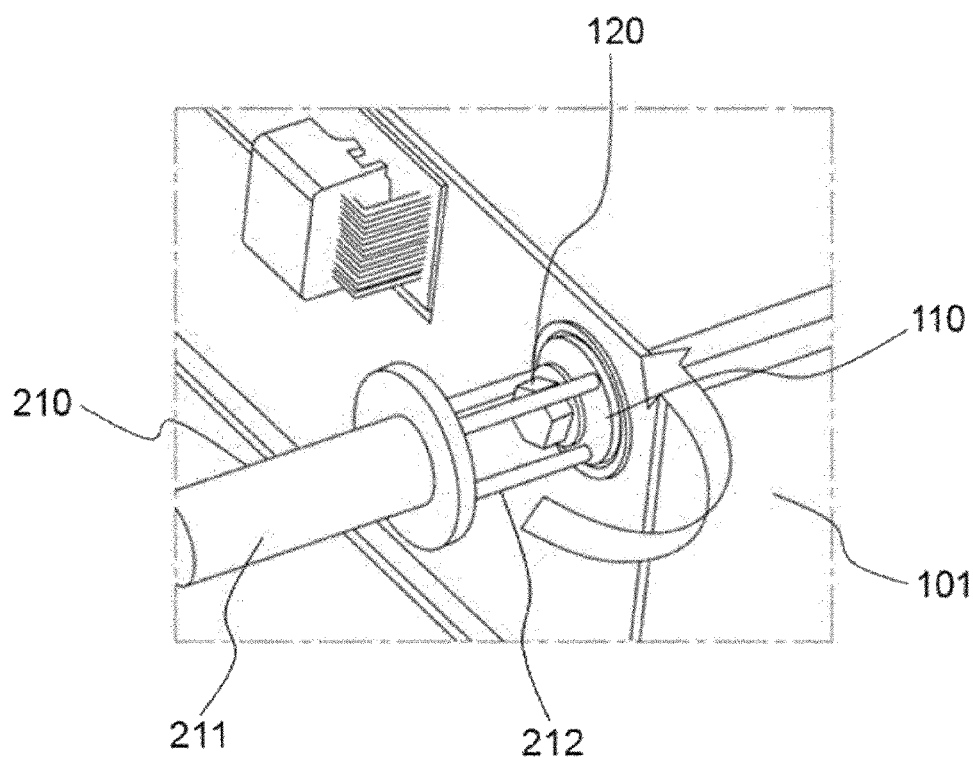

[FIG. 5]
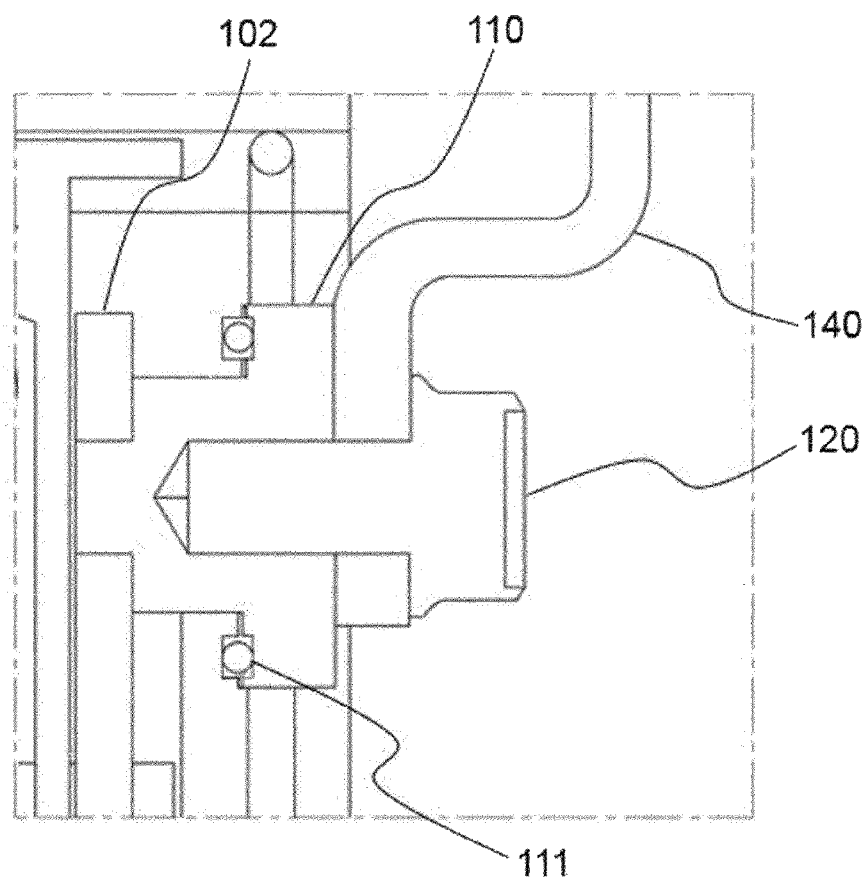

BATTERY MODULE ENSURING AIRTIGHTNESS FOR HV TERMINAL, AND BATTERY PACK COMPRISING SAME

TECHNICAL FIELD

This application claims the benefit of priority based on Korean Patent Application No. 10-2020-0005730, filed on Jan. 16, 2020, and the entire contents of the Korean patent application are incorporated herein by reference.

The present invention relates to a battery module with a battery module with airtightness to a high voltage (HV) terminal and a battery pack including the same.

BACKGROUND ART

In general, a secondary battery is a battery which can be repeatedly used by allowing charging and discharging. The secondary battery consists of one battery module and is used for portable compact electronic devices such as mobile phones, laptops, computers, cameras, camcorders, etc. or consists of a battery pack containing a plurality of cell modules and is used as a power source for driving a motor of a high power hybrid electric vehicle (HEV), electric vehicle (EV), etc.

In particular, electric vehicles use electric energy of a high output, so they need multiple battery modules per vehicle. In order to construct a battery pack including a plurality of cell modules, an electrical connection between the battery modules is required. A HV terminal, which is a kind of a connection terminal, is formed in each battery module, and an electrical connection between the battery modules is performed through the connection between HV terminals formed on one outer side of the battery module.

FIG. 1 is a partial perspective view showing a portion where a HV terminal of a conventional battery module is mounted. Referring to FIG. 1, a battery module 10 is electrically connected to another battery module via a HV terminal 12. A module bus bar is used for electrical connection between the battery modules 10. In the conventional battery module 10, the HV terminal 12 is formed on one side of a battery module case 11 and has a structure exposed to the outside. Specifically, a hole for fastening a bolt is formed in the center of the HV terminal 12, and outer moisture or the like may penetrate into the battery module 10 through the hole. As a result, the moisture penetrating into the battery module 10 through the HV terminal 12 deteriorates the performance of the battery module 10.

DISCLOSURE

Technical Problem

The present invention provides a battery module with airtightness to a HV (High Voltage) terminal, and a battery pack including the same.

Technical Solution

The present invention provides a battery module with airtightness to a high voltage (HV) terminal. In one example, the battery module includes: a plurality of battery cells; a battery module case configured to accommodate the plurality of battery cells, the battery module case having an opening having a screw thread at one side; a high voltage (HV) terminal electrically connected to electrode leads of the plurality of battery cells; and a sealing part inserted and fastened to the opening of the battery module case, the sealing part having a first end contacting the HV terminal and a second end exposed at an external side of the battery module case, wherein the sealing part is configured to allow the HV terminal to be electrically connected externally through the battery module case.

In a specific example, a diameter of the second end of the sealing part is greater than a diameter of the opening.

In a specific example, an insertion groove is formed in the HV terminal, and the first end of the sealing part is inserted into the insertion groove.

Herein, a diameter of a portion of the first end of the sealing part, which is inserted into the insertion groove of the HV terminal, is smaller than a diameter of the opening.

In one example, a module bus bar is fastened between the sealing part and a bolt for fastening the module bus bar, and fastening between the battery module case and the sealing part and fastening between the sealing part and the bolt for fastening the module bus bar are performed by a screw fastening scheme, respectively.

Specifically, a groove for fastening the bolt is formed at an exposed end of the second end of the sealing part, and the bolt for fastening the module bus bar is inserted into the groove.

In a specific example, a screw thread is formed at the groove formed at the exposed end of the second end of the sealing part.

A module bus bar is fastened between the sealing part and the module bus bar fastening bolt.

In a specific example, a fastening direction between the battery module case and the sealing part coincides with a fastening direction between the sealing part and the bolt for fastening the module bus bar.

In another example, 3 to 5 recessed portions arranged at regular intervals are formed at an exposed end of the second end of the sealing part.

In one example, the battery module further includes an O-ring positioned at a portion where the battery module case contacts the sealing part.

In a specific example, the sealing part is made of a conductive metal material.

In one example, the HV terminal is positioned in the battery module case and is not exposed to an external side.

Further, the present invention provides a battery pack including a battery module described above. In one example, the battery pack according to the present invention includes: a battery pack case; and a plurality of battery modules accommodated in the battery pack case, wherein the battery module is the above-described battery module.

In one example, the present invention provides an energy storage device including the above-described battery pack.

In further another example, the present invention provides a vehicle including the above-described battery pack.

Advantageous Effects

According to a battery module and a battery pack according to the present invention, the external moisture penetration can be blocked and the durability of the battery pack can be increased by imparting airtightness to a high voltage (HV) terminal.

BRIEF DESCRIPTION OF THE DRAWINGS

FIG. 1 is a partial perspective view showing a portion where a HV terminal of a conventional battery module is mounted.

FIG. 2 is a partial perspective view showing a sealing part covering the HV terminal in a battery module according to one embodiment.

FIG. 3 is a partial cross-sectional view of a region in which a sealing part covering the HV terminal is formed in a battery module according to one embodiment of the present invention.

FIG. 4 is a partial perspective view showing a process of concluding a sealing part in a battery module case in a battery module according to one embodiment of the present invention.

FIG. 5 is a partial cross-sectional view showing a state in which a module bus bar is fastened to a sealing part covering the HV terminal in a battery module according to one embodiment of the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The present invention provides a battery module. In one example, the battery module includes: a battery module case configured to accommodate a plurality of battery cells and have an opening having a screw thread at one side; a high voltage (HV) terminal having a structure electrically connected to electrode leads from the plurality of battery cells; and a sealing part configured to be inserted and fastened to an opening of the battery module case, wherein the sealing part allows the HV terminal to be electrically connected to an external side, one end of the sealing part contacts the HV terminal, and an other end of the sealing part is exposed to an external side of the battery module case to thereby contact a module bus bar.

The HV terminal is a cell bus bar that electrically connects each battery cell by welding the electrode leads from the battery cell. The conventional battery module has a structure in which the HV terminal is exposed to the outside of the battery module, which causes the external moisture to be penetrated into the battery module through the HV terminal. This causes durability issues such as corrosion of internal battery cells, and may cause performance degradation and ignition of the battery module.

In the present invention, the HV terminal is housed inside the battery module case, and there is provided a sealing part for electrically connecting the HV terminal with an external side while blocking the external exposure of the HV terminal. Thus, the battery module according to the present invention may block the external moisture penetration path due to the HV terminal formation and maintain the performance of the battery module for a long time.

Specifically, the sealing part has a structure in which the diameter of the end exposed to the outside is greater than the diameter of the opening. Accordingly, the cross section of the sealing part has a structure in which a step is formed like "凸" shape. By setting the diameter of the end exposed to the outside in the sealing part to be greater than the diameter of the portion contacting the opening, it is possible to prevent the sealing part from being inserted deeply into the module into the module by the external force. In addition, the contact area of the module case and the sealing part can be increased to further improve the airtightness of the battery module.

In addition, by forming steps to allow the cross section of the opening formed in the battery module case to correspond to the cross-sectional shape of the sealing part, the sealing part can be stably coupled with the battery module case.

In addition, an insertion groove may be formed in the HV terminal, and one end of the sealing part may be inserted into the insertion groove. At this time, the diameter of the portion to be inserted into the insertion groove in the sealing part may be set to be smaller than the diameter of the opening. Namely, as the diameters the end exposed to the outside in the sealing part, the portion contacting the opening, and the portion inserted into the insertion groove decrease, 2 steps are formed at the sealing part. This plays a role of preventing the movement of the sealing part by fixing the end contacting the HV terminal in the sealing part.

On the other hand, the HV terminal of the battery module should be connected to the module bus bar for electrical connection between the battery modules. The module bus bar is fastened between the sealing part and a bolt to be used for fastening the module bus bar. Further, the fastening between the opening of the battery module case and the sealing part and the fastening between the sealing part and the bolt for fastening the module bus bar are performed by a screw fastening scheme, respectively. In the present invention, by fastening a module bus bar between a sealing part and a bolt for fastening a bus bar, an electrical connection between the battery modules is performed. The battery module according to the present invention has a structure in which the HV terminal is sealed at the inside of the battery module and at the same time, the sealing part is directly fastened with the module bus bar for electrical connection of the battery module.

Specifically, a groove for fastening the bolt is formed at an end exposed to the external side of the sealing part, and a bolt for fastening the module bus bar is inserted into the groove. Specifically, a screw thread for bolt insertion is formed at the groove formed at the end exposed to the external side of the sealing part. Through this, a module bus bar is fastened between the sealing part and the module bus bar fastening bolt. Specifically, in a state that a module bus bar is positioned between the sealing part and the bolt for fastening the bus bar, the module bus bar is fixed by fastening the bolt for fastening the bus bar at the sealing part.

In a specific example, a screw thread is formed at a groove formed at the end exposed to the external side of the sealing part, and a screw thread corresponding to the screw thread of the sealing part is formed at the bolt for fastening the bus bar. The fastening method between the sealing part and the bolt for fastening the bus bar can be variously modified. For example, it is also possible to apply an adhesive or apply a hinge structure. However, it is advantageous to apply a screw fastening method in consideration of rigidity and the possibility of detachment. For example, a female screw thread is formed at a groove formed at the end exposed to the external side of the sealing part, and a male screw thread corresponding to the female screw thread of the sealing part is formed at the bolt for fastening the module bus bar.

Further, a fastening direction between the opening of the battery module case and the sealing part coincides with a fastening direction between the sealing part and the bolt for fastening the module bus bar. As such, in a state that the module bus bar is located between the sealing part and the bolt for fastening the module bus bar, if the bolt for fastening the module bus bar is fastened with the sealing part, it is possible to prevent the release of the fastening between the battery module case and the sealing part.

In another example, 3 to 5 recessed portions arranged at regular intervals are formed at an end exposed to an external side of the sealing part. The sealing part has a structure that minimizes the end exposed to the outside in order to prevent external moisture and the like from being introduced into the battery module. A groove for fastening the bolt for fastening the bus bar is formed at the sealing part, and 3 to 5 recessed portions arranged at regular intervals are formed around the groove. The recessed portion corresponds to a position where the sealing part fastening tool is contacted when fastening the sealing part at the battery module case. The sealing part fastening tool has a structure where a protrusion corresponding to the recessed portion exposed to the external side of the sealing part is formed. In a state that the protrusion of the sealing part fastening tool has been inserted into the recessed portion of the sealing part, the sealing part fastening tool may be rotated to thereby allow the sealing part to be mounted on the battery module case.

In one example, the battery module according to the present invention further includes an O-ring positioned at a portion where the battery module case contacts the sealing part. The O-ring is made of a rubber material which may be shrunk and modified according to the pressure to thereby apply airtightness. The battery module according to the present invention prevents the HV terminal from being exposed to the external side of the battery module by fastening the sealing part. However, the external moisture can penetrate along the contact site between the battery module case and the sealing part. In the present invention, by positioning the O-ring at the contact site of the battery module case and the sealing part, the moisture penetration path is blocked. In the present invention, in addition to the O-ring, a silicon tape or a polytetrafluoroethylene (PTFE) tape or the like can be used to prevent water from penetrating along the contact site of the battery module case and the sealing part. Further, when a step is formed on the sealing part, the O-ring may be positioned at the portion protruding by the step and the portion in contact with the battery module case.

In one embodiment, the sealing part may be made of a conductive metal material. This is for electrical connection between the module bus bar and the HV terminal. Specifically, a conductive metal material constituting the sealing part may be one selected from the group consisting of iron, aluminum, copper, gold, silver, nickel, titanium, stainless steel, or alloys thereof, and more specifically, copper is most preferred. In addition, the sealing part may be made of a material which is homogeneous with the material of the HV terminal.

In one embodiment, one end of the sealing part contacts the HV terminal, and the other end of the sealing part is exposed to the outside of the battery module case. In addition, the HV terminal is located in the battery module case and is not exposed to the outside. Thus, the battery module of the present invention can be formed so that the HV terminal is not exposed to the outside and can effectively block penetration of water, etc. into the battery module.

The present invention provides a battery pack including a battery module described above. In one embodiment, a battery pack according to the present invention includes: a battery pack case; and a plurality of battery modules accommodated in the battery pack case.

The battery module includes a multiple of secondary batteries and a battery module case accommodating them, and an electrical device mounted around the module. In particular, the battery cell may be a pouch-type battery cell and has a structure having an electrode assembly, an electrolyte solution, and a pouch case. The configuration of such a battery cell is obvious to a person skilled in the art to which the present invention pertains, and thus a more detailed description thereof will be omitted. In addition, various secondary batteries known at the time of filing the present invention may be employed in the battery pack according to the present invention. In addition, the electrical device includes a battery management system (BMS) that monitors and controls the operation of a battery module, a battery disconnection unit (BDU) that controls electrical connections of the battery module, a fuse that is located between the battery module and the BMS and provides a function of blocking overcurrent, etc.

The battery pack case includes a tray where a battery module is mounted at a lower side, and a pack cover covering the side and top of the battery module, and the tray and the pack cover may be coupled in a bolt fastening manner.

Further, the present invention provides an energy storage device including the battery pack. The storage device is, for example, an energy storage system (ESS) capable of storing a large amount of electrical energy. Further, the present invention provides a vehicle including the battery pack. The automobile includes a hybrid automobile, a plug-in car or an electric vehicle, and the like. The vehicle includes various forms of vehicles which use the above-described battery pack as a main power or auxiliary power.

Hereinafter, the present invention will be described in more detail through drawings and the like. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

First Embodiment

FIG. 2 is a partial perspective view showing a sealing part covering the HV terminal in a battery module according to one embodiment. Referring to FIG. 2, a battery module according to the present invention has a structure in which a HV terminal is accommodated in a battery module case, and a sealing part 110, which electrically connects the HV terminal to an external side, is inserted into an opening 113 formed in the battery module case 101. A thread is formed in the opening, so that the sealing part can be fastened through a screw fastening method. Further, a groove for bolt fastening is formed in the central portion of the end exposed to the outside in the sealing part 110, and a bolt 120 for fastening a module bus bar is fastened through the groove. As such, the sealing part and the bolt for fastening the module bus bar are also fastened by the screw fastening method.

The battery module according to the present invention forms the sealing part 110 that prevents the HV terminal of the battery module from being exposed to the outside and allows a module bus bar to be fastened between the sealing part 110 and the bolt 120 for fastening the module bus bar. A female screw thread is formed at a groove formed at the end exposed to the external side of the sealing part 110, and a male screw thread corresponding to the female screw thread of the sealing part 110 is formed at the bolt 120 for fastening the bus bar. In the present invention, as a screw fastening method is used as a fastening method between the sealing part 110 and the bolt 120 for fastening the module bus bar, the fastening is rigid and detachable as necessary.

Further, the sealing part 110 has a groove for fastening the bolt 120 for fastening the module bus bar, and three recessed portions 112 arranged in equal intervals are formed around the groove. Each of the recessed portions 112 is a position where sealing part fastening tool is inserted when the sealing part 110 is coupled with the battery module case 101.

FIG. 3 is a partial cross-sectional view of a region in which a sealing part covering the HV terminal is formed in a battery module according to one embodiment of the present invention. Referring to FIG. 3, the battery module 100 according to the present invention includes a structure in which a plurality of battery cells 130 are accommodated in the battery module case 101. The electrode lead 131 of the battery cell 130 has a structure electrically connected to the HV terminal 102. The HV terminal 102 is connected to another battery module for the purpose of electrical connection between the battery modules 100, etc.

The HV terminal 102 has a structure electrically connected to the sealing part 110. The sealing part 110 is made of a conductive metal material such as copper or an alloy thereof, or an aluminum or an alloy thereof, and is made of the same material as that of the HV terminal 102. The sealing part 110 has a structure which is fixed to the battery module case 101 through a screw fastening. The sealing part 110 is fastened to the battery module case 101 via a sealing part fastening tool to be described later. A O-ring 111 is located between the sealing part 110 and the battery module case 101. By forming the O-ring 111, a path, through which the external moisture penetrates, is blocked along the portion where the sealing part 110 is coupled with the battery module case 101.

Further, there is a groove, in which a screw thread is formed, at the end exposed to the outside of the sealing part 110, and in the groove, the bolt 120 for fastening the module bus bar is fastened through the screw fastening. Since the sealing part 110 and the module bus bar fastening bolt 120 are fastened through the screw fastening, it is detachable if necessary.

Further, one end of the sealing part 110 contacts the HV terminal 102, and the other end of the sealing part is exposed to the outside of the battery module case to thereby contact the module bus bar. The HV terminal 102 has an insertion groove 103, and the one end of the sealing part 110 is in contact with the HV terminal 102 in a state that the one end has been inserted into the insertion groove 103. At this time, the diameter of the portion exposed to the outside in the sealing part is larger than the diameter of the opening 113, and the diameter of the portion, which is inserted into the insertion groove 103, is smaller than the diameter of the opening 113. Accordingly, two steps are formed in the sealing part 110.

Second Embodiment

FIG. 4 is a partial perspective view showing a process of concluding a sealing part in a battery module case in a battery module according to one embodiment of the present invention. Referring to FIG. 4, the sealing part 110 has a groove for fastening the bolt 120 for fastening the module bus bar, and three recessed portions arranged in equal intervals are formed around the groove. Each the recessed portions is a position where a sealing part fastening tool 210 is contacted when the sealing part 110 is coupled with the battery module case 101. The sealing part fastening tool 210 has a structure in which three protrusions 212 extending in the body part 211 are formed. The protrusion 212 of the sealing part fastening tool 210 has a shape corresponding to the recessed portion exposed to the external side of the sealing part 110. In a state that the protrusion 212 of the sealing part fastening tool 210 has been inserted into the recessed portion of the sealing part 110, the sealing part fastening tool 210 is rotated to thereby allow the sealing part 110 to be mounted on the battery module case 101.

Further, as described above, the fastening between the battery module case 101 and the sealing part 110 and the fastening between the sealing part 110 and the bolt 120 for fastening the module bus bar are performed by the screw fastening scheme, respectively. Further, the fastening direction between the opening of the battery module case 101 and the sealing part 101 coincides with the fastening direction between the sealing part 110 and the bolt 120 for fastening the module bus bar. Therefore, even if the bolt 120 for fastening the module bus bar is turned in a tightening direction, the fastening between the battery module case 101 and the sealing part 110 is released.

Third Embodiment

FIG. 5 is a partial cross-sectional view showing a state in which a module bus bar is fastened to a sealing part covering the HV terminal in a battery module according to one embodiment of the present invention. Referring to FIG. 5, the HV terminal 102 has a structure housed inside the battery module case and has a structure electrically connected to the sealing part 110. The sealing part 110 is fixed at the battery module case through a screw fastening and an O-ring 111 is located on the contact portion between the sealing part 110 and the battery module case 101. By forming the O-ring 111, a path, through which the external moisture penetrates, is blocked along the portion where the sealing part 110 is coupled with the battery module case 101.

There is a groove, in which a screw thread is formed, at the end exposed to the outside of the sealing part 110, and in the groove, the bolt 120 for fastening the module bus bar is fastened through the screw fastening. Therefore, the bolt 120 for fastening the module bus bar can be detached as needed.

The module bus bar 140 is fastened between the sealing part 110 and the bolt 120 for fastening the module bus bar. The module bus bar 140 performs electrical connection between the battery modules and is formed of, for example, copper or its alloy. The end of the module bus bar 140 has a structure in which a recess or hole is formed so that the side surface of the bolt 120 for fastening the module bus bar is wrapped. In a state that the recess of the module bus bar 140 is engaged with the side of the bolt 120 for fastening the module bus bar, the bolt 120 for fastening the module bus bar is rotated to be fixed at the sealing part 110.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

DESCRIPTION OF REFERENCE NUMERALS 10, 100: battery module
11, 101: battery module case
12, 102: HV terminal
103: insertion groove
110: sealing part
111: O-ring
112: recessed portion
113: opening
120: bolt for fastening module bus bar
130: battery cell
131: electrode tab or lead
140: module bus bar
210: sealing part fastening tool
211: body part
212: protrusion

The invention claimed is:

1. A battery module comprising:
a plurality of battery cells;
a battery module case configured to accommodate the plurality of battery cells, the battery module case having an opening having a screw thread at one side;
a high voltage (HV) terminal electrically connected to electrode leads of the plurality of battery cells, the HV terminal having an insertion groove having a diameter that is smaller than a diameter of the opening; and
a sealing part inserted and fastened to the opening of the battery module case, the sealing part having a screw thread configured to engage the screw thread of the opening, the sealing part having a first end contacting the HV terminal and a second end exposed at an external side of the battery module case, the first end of the sealing part being inserted into the insertion groove, a diameter of a portion of the first end of the sealing part being smaller than a diameter of the opening and larger than the diameter of the insertion groove, and a diameter of the second end of the sealing part being greater than a diameter of the opening such that the sealing part has a two-step shape,
wherein the sealing part is configured to allow the HV terminal to be electrically connected externally through the battery module case.

2. The battery module of claim 1, further comprising a module bus bar fastened between the sealing part and a bolt for fastening the module bus bar, and
wherein fastening between the sealing part and the bolt for fastening the module bus bar are performed by a screw fastening scheme.

3. The battery module of claim 2, wherein a groove for fastening the bolt is formed at an exposed end of the second end of the sealing part, and the bolt for fastening the module bus bar is inserted into the groove.

4. The battery module of claim 3, wherein a screw thread is formed at the groove formed at the exposed end of the second end of the sealing part.

5. The battery module of claim 2, wherein a fastening direction between the battery module case and the sealing part coincides with a fastening direction between the sealing part and the bolt for fastening the module bus bar.

6. The battery module of claim 1, wherein 3 to 5 recessed portions arranged at regular intervals are formed at an exposed end of the second end of the sealing part.

7. The battery module of claim 1, further comprising an O-ring positioned at a portion where the battery module case contacts the sealing part.

8. The battery module of claim 1, wherein the sealing part is made of a conductive metal material.

9. The battery module of claim 1, wherein the HV terminal is positioned in the battery module case and is not exposed to an external side.

10. A battery pack comprising:
a battery pack case; and
a plurality of battery modules accommodated in the battery pack case,
wherein the battery module is a battery module according to claim 1.

11. An energy storage device comprising the battery pack according to claim 10.

12. A vehicle comprising the battery pack according to claim 10.

* * * * *